United States Patent
Comer et al.

(10) Patent No.: US 6,221,001 B1
(45) Date of Patent: Apr. 24, 2001

(54) FLY-ASH SLURRY WITH SOLIDIFICATION RETARDANT

(75) Inventors: John Philip Comer, Manchester, NH (US); Kenneth Eugene Baldrey, Denver, CO (US); John Wurster, Evergreen, CO (US); Robert P. Sterner, Lakewood, CO (US)

(73) Assignee: ADA Environmental Solutions LLC, Littleton, CO (US)

( * ) Notice: Subject to any disclaimer, the term of this patent is extended or adjusted under 35 U.S.C. 154(b) by 0 days.

(21) Appl. No.: 09/238,005

(22) Filed: Jan. 26, 1999

(51) Int. Cl.[7] ................................................. C04B 22/00
(52) U.S. Cl. ......................... 588/252; 106/705; 106/708; 406/45
(58) Field of Search .................. 106/705, 708, 106/DIG. 1; 588/249, 252; 406/47, 45

(56) References Cited

U.S. PATENT DOCUMENTS

| | | | |
|---|---|---|---|
| 3,346,488 | * 10/1967 | Lyons, et al. | 507/128 |
| 4,121,945 | 10/1978 | Hurst et al. | 106/405 |
| 4,313,762 | * 2/1982 | Pound | 106/DIG. 1 |
| 4,618,376 | * 10/1986 | Saternus et al. | 106/705 |
| 4,749,492 | 6/1988 | Berrigan, Jr. et al. | 210/616 |
| 4,778,598 | 10/1988 | Hoffman et al. | 210/710 |
| 4,871,283 | * 10/1989 | Wright | 405/263 |
| 5,089,142 | 2/1992 | Turunc | 210/728 |
| 5,215,575 | 6/1993 | Butler | 75/744 |
| 5,224,595 | * 7/1993 | Sugimoto et al. | 206/321 |
| 5,256,198 | 10/1993 | Sinha | 106/708 |
| 5,351,630 | 10/1994 | Lister et al. | 110/165 |
| 5,681,384 | 10/1997 | Liskowitz et al. | 106/710 |

OTHER PUBLICATIONS

Calgon Coproration; "Relative Efficiency of Phosphates Used in Boiler Water Conditioning"; 4 pages. (Undated).

\* cited by examiner

*Primary Examiner*—Eileen D. Lillis
*Assistant Examiner*—John Kreck
(74) *Attorney, Agent, or Firm*—Sheridan Ross P.C.

(57) ABSTRACT

A method using retardant to inhibit solidification of slurried fly ash particles that were collected on a collection surface. The slurried particles are transported in a pipeline to a collection or disposal site during or after the addition of the retardant to the slurry. The retardant can be a dispersant, a deflocculant, a scale inhibitor or a sequestering agent such as a phosphate, organic phosphate, polymer, and mixtures thereof.

25 Claims, 1 Drawing Sheet

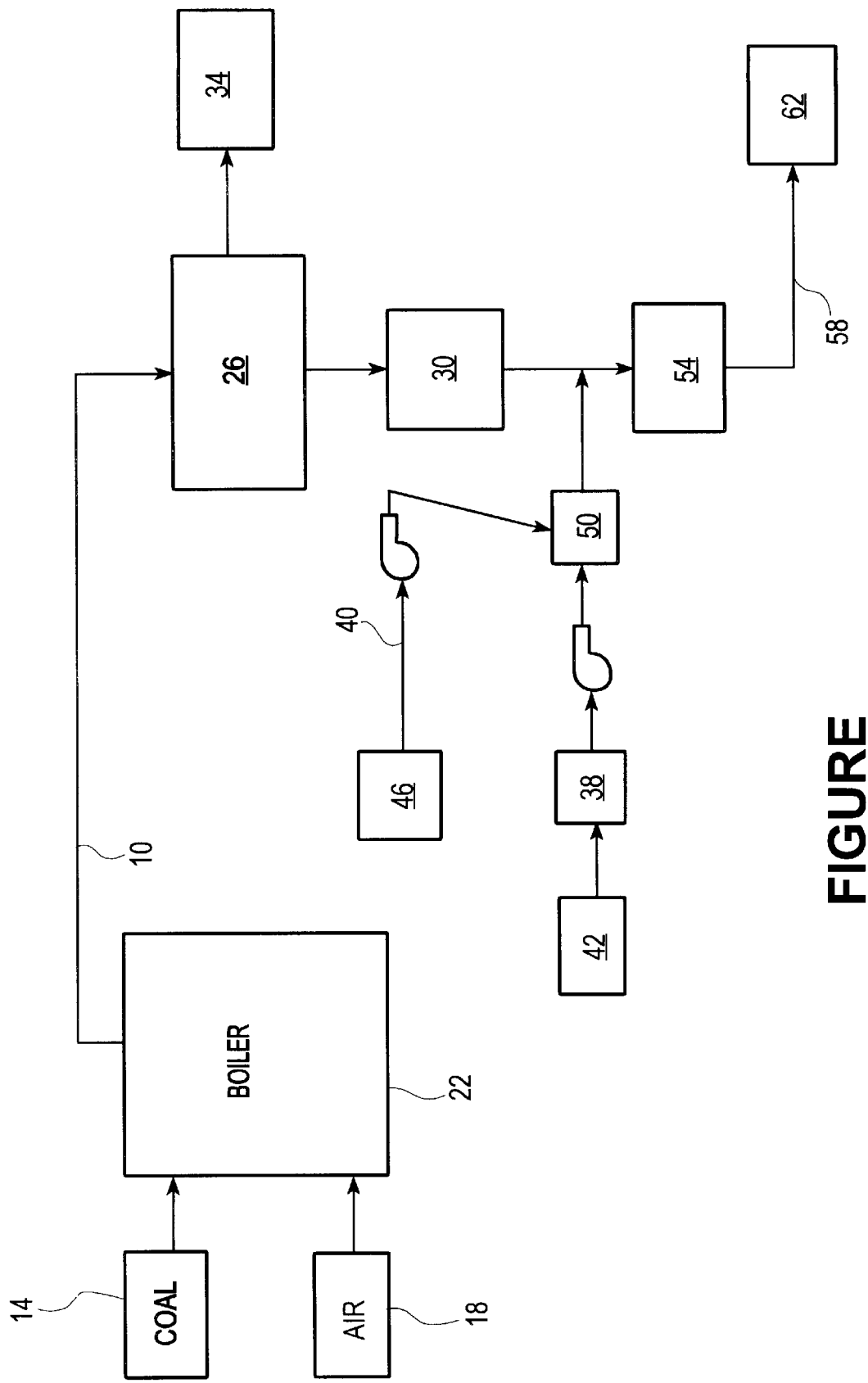
FIGURE

FLY-ASH SLURRY WITH SOLIDIFICATION RETARDANT

FIELD OF THE INVENTION

The present invention is directed generally to a method for wet handling of fly ash particles removed from flue gas and specifically to a method for wet handling of fly ash that uses a retardant to inhibit solidification of the fly ash.

BACKGROUND

In coal burning power plants, fly ash particles are entrained in the waste gas and must be removed prior to discharge of the waste gas into the environment. Common methods for removal of the fly ash include electrostatic precipitators, baghouses, and scrubbers.

One method for disposal of the collected fly ash particles is to slurry the collected particles and transport the slurry by pipeline to a suitable disposal site. This disposal method requires little handling of the fly ash and, therefore, can be relatively inexpensive to perform.

The disposal method, however, can have drawbacks. The slurry can solidify in the pipeline during transportation of the slurry to the waste disposal site, particularly when the slurry pump malfunctions or other flow stoppages occur. The solidified deposits resemble concrete and can partially or totally block the pipeline, thereby interrupting operation of the plant. Such deposits can be very difficult and expensive to remove. Because solidification is more likely to occur in higher calcium fly ashes, power plants using this waste disposal method have had to use more expensive, lower calcium coal to generate power.

SUMMARY OF THE INVENTION

Objectives of the present invention include providing a pipeline transportation system in which slurried fly ash particles, particularly high calcium content fly ash particles, are unlikely to solidify in the pipeline during transportation.

The method of the present invention removes undesired particles from a gas stream by the following steps:

(a) removing the undesired particles from the gas stream to form collected particles;
(b) forming the collected particles into a slurry; and
(c) transporting the slurry in a conduit to a disposal site, wherein the slurry includes a retardant to inhibit substantially the solidification of the slurry in the conduit.

The undesired particles are typically fly ash particles that are formed by the combustion of coal. The fly ash particles commonly have a calcium content ranging from about 5 to about 50 and more commonly from about 15 to about 30 wt %.

The retardant can be any compound(s) that is able to inhibit the solidification of the slurry in the conduit.

The most preferred scale inhibitors include molecularly dehydrated phosphate and more particularly hexametaphosphates, pyrophosphates, tripolyphosphates, phosphonates, and mixture thereof. As used herein, "molecularly dehydrated phosphates" refers to the class of phosphate compounds, the members of which are formed by molecular dehydration; that is, the members are formed by removal of the water of constitution, which is water that forms an integral part of the molecule in contrast to attached water or water of crystallization. Molecularly dehydrated phosphates not only preferentially react with dissolved metals such as calcium, iron, magnesium and manganese but also have dispersing properties that aid in the removal of existing water-soluble metal salts.

In a preferred retarded mixture, at least most of the retardant is phosphates. More preferably, the retardant mixture contains at least about 25% by weight and more preferably from about 5 to 40% by weight phosphates.

The particularly preferred retardant mixture includes a hexametaphosphate and tripolyphosphate. More preferably, the retardant mixture includes from about 4 to about 38% and even more preferably from about 20 to about 35 wt % hexametaphosphate and more preferably from about 1 to about 5% and even more preferably from about 2 to about 4 wt % tripolyphosphate.

While not wishing to be bound by any theory, it is believed that the preferred scale inhibitors preferentially react with calcium before hydration can occur and thereby inhibit the reaction of the calcium ions with silica or alumina and the subsequent precipitation of calcium silica and calcium alumina deposits in the conduit. Such deposits can cause partial or total blockages of slurry flow through the conduit. Accordingly, the removal of calcium is believed to inhibit solidification of the slurry in the conduit.

The amount of the retardant in the slurry can be important to the performance of the additive. Preferably, the concentration of the retardant in the slurry ranges from about 0.01 to about 0.20 g/l and more preferably from about 0.035 to about 0.14 g/l. The ratio of the retardant to the undesired particles ranges from about 0.5 to about 15 g/kg and more preferably from about 1.0 to about 10 g/kg.

The retardant is preferably introduced as an aqueous liquid composition into the slurry or into the liquid used to form the slurry. The concentration of the retardant in the aqueous composition preferably ranges from about 0.01 to about 0.20 g/l and more preferably from about 0.035 to about 0.14 g/l. The rate of introduction of the aqueous composition into the slurry or the liquid used to form the slurry ranges from about 10 mls/min to about 2 l/min. The volumetric ratio of the aqueous composition to the slurry preferably ranges from about 0.1:10,000 to about 1.5:10,000 and more preferably, from about 0.2:10,000 to about 1.0:10,000.

The above-described method can offer many benefits, especially to utilities. For example, the equipment to implement the process (e.g., a storage tank and metering pump) is relatively inexpensive to purchase and install, is highly reliable, and is easy to use. The retardant can be environmentally safe, non-hazardous, non-toxic, and relatively inexpensive. The retardant can inhibit not only cementation but also build-up of deposits caused by the precipitation of water-soluble calcium and magnesium salts and prevent the precipitation of dissolved calcium, magnesium, iron, and manganese. The rate of injection of the retardant to the water or slurry is adjustable to match undesired particle cementing characteristics. The retardant is preferably in liquid form, which is easy to feed to the slurry. Finally, the retardant permits utilities, who have a wet flyash handling system, to switch to coals producing high calcium flyash without having to perform expensive retrofits of the ash handling system.

BRIEF DESCRIPTION OF THE DRAWINGS

The attached FIGURE is a flow schematic depicting a preferred embodiment of the process of the present invention.

DETAILED DESCRIPTION

Referring to the attached FIGURE, the waste gas 10 is produced by combusting coal 14 and air 18 in a boiler 22.

The waste gas 10 contains fly ash and other undesired particles entrained in the gas. Typically, the waste gas 10 includes from about $5.4 \times 10^{-5}$ to about $9.5 \times 10^{-4}$ lb/cubic foot of undesired particles.

The waste gas 10 is passed to a particle removal device 26 to remove the undesired particles from the waste gas 10. The particle removal device 26 can be any suitable device including an electrostatic precipitator, a baghouse or other type of filtration device, a wet scrubber, a centrifuge, a cyclone, and the like. The particle removal device 26 removes substantially all of the undesired particles from the waste gas 10 to form recovered undesired particles 30 and the treated waste gas 34. The treated waste gas 34 is typically discharged into the atmosphere. The recovered undesired particles 30 are collected in a hopper (not shown) or other suitable device for disposal.

To dispose of the recovered undesired particles 30, the retardant mixture 38, which is commonly stored on site in a storage vessel 42, is mixed with water 40 from a water source 46. The retardant mixture is typically an aqueous mixture containing the retardant. The concentration of the retardant in the aqueous mixture 38 ranges preferably from about 200 to about 400 g/l.

The retardant is preferably a molecularly dehydrated phosphate. A particularly preferred retardant is a mixture of hexametaphosphate and a tripolyphosphate. More preferably, the retardant mixture includes from about 20 to about 35 wt % (sodium) hexametaphosphate and from about 1 to about 5 tripolyphosphate.

The retardant mixture 38 and the water 40 are mixed to form a composite mixture 50. The composite mixture 50 preferably includes from about 0.001 to about 0.015 wt % retardant. The mixing ratio of the retardant mixture 38 to the water 40 preferably ranges from about 0.1:10,000 to about 1.0:10,000. The rate of injection of the retardant mixture into the water preferably ranges from about 0.035 to about 0.14 g/l.

The composite mixture 50 is then mixed with the recovered undesired particles 30 to form a slurry 54. Preferably, the ratio of the retardant to the undesired particles in the slurry ranges from about 0.5 to about 15 g/kg.

Preferably, the retardant reacts with at least most and more preferably at least about 98% of the calcium, magnesium, iron, and manganese in the slurry.

The slurry 54 is then transported via a conduit 58, such as a pipeline, to a disposal site 62.

The retardant can also be introduced as sprayed aqueous liquid composition into the flue gas duct. This is accomplished by means of a spraying system inserted into the flue gas duct either upstream of the ash collection device or in the collection hopper which the ash collection device empties into. This arrangement can have the added benefits of placing the chemical directly onto the ash, thereby improving the performance of the chemical. If placed upstream of the collection device, it can also improve the collection efficiency of the collection device.

In this arrangement, the concentration of the retardant in the aqueous composition preferably ranges from about 0.01 to about 0.20 g/l and more preferably from about 0.035 for about 0.14 g/l. The weight ratio of the retardant to the ash ranges from about 0.01:100 to about 1:100 and more preferably from about 0.1:100 to about 0.75:100. Upon injection of the aqueous composition into the flue gas stream, the water vaporizes leaving retardant particles for collection along with the flyash particles on the collection surface. Preferably, the sauter mean diameter of the droplets upon injection (and before vaporization of the water) ranges from about 20 to about 150 microns and, after vaporization of the water, ranges from about 1 to about 10 microns.

Alternatively, the retardant can be introduced as a solid in the ash conveying system. This is accomplished by means of a suitable hopper and metering feeder system to add the dry chemical into the ash conveying system after the ash has been collected and before the ash is contacted with water. This arrangement also has the advantage of placing the chemical in close proximity to the ash, where it can be most effective.

It is preferred that the retardant be introduced as a plurality of particles having a relatively small sizes. Preferably, the mean diameter of the particles ranges from about 1 to about 1,000 microns and more preferably from about 1 to about 100 microns with at least about 50% of the particles having a smaller size than about 25 microns.

In this arrangement, the weight ratio of the retardant to the ash ranges from about 0.01:100 to about 1:100 and more preferably from about 0.1:100 to about 0.75:100.

While various embodiments of the present invention have been described in detail, it is apparent that modifications and adaptations of those embodiments will occur to those skilled in the art. For example, the retardant mixture can be added directly to the water prior to formation of the slurry as shown in the FIGURE or can be added to the slurry during or after formation of the slurry. However, it is to be expressly understood that such modifications and adaptations are within the scope of the present invention, as set forth in the following claims.

What is claimed is:

1. A method for removing undesired particles from a gas stream, the steps of:
    removing the undesired particles from the gas stream to form collected particles;
    forming the collected particles into a slurry; and
    transporting the slurry in a conduit to a disposal site, wherein the slurry includes a retardant to inhibit substantially the solidification of the slurry in the conduit and wherein the concentration of the retardant in the slurry ranges from about 0.01 to about 0.02 g/l.

2. The method of claim 1, wherein the retardant is selected from the group consisting of mineral acids, salts of mineral acids, chelants, sequestrants, organic phosphates, polymers, and mixtures thereof.

3. The method of claim 1, wherein the retardant is selected from the group consisting of phosphoric acid, organic phosphates, inorganic phosphates, polyacrylates, and mixtures thereof.

4. The method of claim 1, wherein the retardant is selected from the group consisting of phosphorus pentoxide, metaphosphoric acid, pyrophosphoric acid, orthophosphoric acid, hexametaphosphate, pyrophosphate, orthophosphate, tripolyphosphate, organic phosphates, polyacrylates, and mixtures thereof.

5. The method of claim 1, wherein the retardant is a molecularly dehydrated phosphate.

6. The method of claim 1, wherein the retardant includes at least about 40% by weight phosphates.

7. The method of claim 1, further comprising contacting the retardant as an aqueous composition with the undesired particles.

8. The method of claim 7, wherein the concentration of the retardant in the aqueous composition ranges from about 0.035 to about 0.14 g/l.

9. The method of claim 8, wherein the rate of injection of the aqueous composition into the gas stream ranges from about 10 mls./min to about 2 l/min.

10. The method of claim 1, wherein the amount of retardant added to the undesired particles ranges from about 0.5 to about 15 g/kg.

11. The method of claim 1, wherein the volumetric ratio of the retardant to the slurry ranges from about 0.1:10,000 to about 1.5:10,000.

12. The method of claim 1, wherein the retardant comprises from about 20 to about 35 wt % hexametaphosphate and from about 1 to about 5 wt % tripolyphosphate.

13. A method for removing undesired particles from a gas stream, comprising the steps of:

collecting the undesired particles on a collection surface to form collected particles;

removing the collected particles from the collection surface;

forming the removed collected particles into a slurry; and transporting the slurry in a conduit to a disposal site, wherein the slurry includes a retardant that is at least one of a scale inhibitor, a dispersant, a sequestering agent, and a deflocculant to inhibit substantially the solidification of the slurry in the conduit, wherein the retardant is selected from the group consisting of mineral acids, salts of mineral acids, chelants, sequestrants, organic phosphates, polymers and mixtures thereof and wherein the concentration of the retardant in the slurry ranges from about 0.01 to about 0.20 g/l.

14. The method of claim 13, wherein the retardant is selected from the group consisting of mineral acids, salts of mineral acids, chelants, sequestrants, organic phosphates, polymers and mixtures thereof.

15. The method of claim 14, further comprising injecting the retardant as an aqueous composition into the slurry.

16. The method of claim 15, wherein the concentration of the retardant in the aqueous composition ranges from about 0.01 about 0.20 g/l.

17. The method of claim 14, wherein the retardant comprise from about 20 to about 35 wt % hexametaphosphate and from about 1 to about 5 wt % tripolyphosphate.

18. The method of claim 13, wherein the retardant is selected from the group consisting of phosphoric acid, inorganic phosphates, organic phosphates, polyacrylates, polymers, and mixtures thereof.

19. The method of claim 13, wherein the retardant includes at least one of hexametaphosphate and tripolyphosphate.

20. The method of claim 19, wherein the retardant includes at least about 40% by weight phosphates.

21. A method for removing undesired particles from a gas stream, comprising the steps of:

collecting the undesired particles on a collection surface to form collected particles;

removing the collected particles from the collection surface;

forming the removed collected particles into a slurry; and transporting the slurry in a conduit to a collection site, wherein during at least one of the forming and transporting steps the slurry is contacted with a retardant to inhibit substantially the solidification of the slurry in the conduit, the retardant being selected from the group consisting of phosphoric acid, inorganic phosphates, organic phosphates, polyacrylates, and mixtures thereof and wherein the volumetric ratio of the retardant to the slurry ranges from about 0.1:10,000 to about 1.5:10,000.

22. A method for removing undesired particles from a gas stream, comprising the steps of:

removing the undesired particles from the gas stream to form collected particles;

forming the collected particles into a slurry; and transporting the slurry in a conduit to a disposal site, wherein the slurry includes a retardant to inhibit substantially the solidification of the slurry in the conduit and wherein the amount of retardant added to the undesired particles ranges from about 0.5 to about 15 g/kg.

23. A method for removing undesired particles from a gas stream, comprising the steps of:

removing the undesired particles from the gas stream to form collected particles;

forming the collected particles into a slurry; and transporting the slurry in a conduit to a disposal site, wherein the slurry includes a retardant to inhibit substantially the solidification of the slurry in the conduit and wherein the volumetric ratio of the retardant to the slurry ranges from about 0.1:10,000 to about 1.5:10,000.

24. A method for removing undesired particles from a gas stream, comprising the steps of:

removing the undesired particles from the gas stream to form collected particles;

forming the collected particles into a slurry; and transporting the slurry in a conduit to a disposal site, wherein the slurry includes a retardant to inhibit substantially the solidification of the slurry in the conduit and wherein the retardant comprises from about 20 to about 35 wt % hexametaphosphate and from about 1 to about 5 wt % tripolyphosphate.

25. A method for removing undesired particles from a gas stream, comprising the steps of:

collecting the undesired particles on a collection surface to form collected particles;

removing the collected particles from the collection surface;

forming the removed collected particles into a slurry; and transporting the slurry in a conduit to a disposal site, wherein the slurry includes a retardant that comprises from about 20 to about 35 wt % hexametaphosphate and from about 1 to about 5 wt % tripolyphosphate.

* * * * *